Sept. 8, 1964        P. D. FADOW        3,147,537
METHOD OF MANUFACTURING BALL JOINTS
Filed April 3, 1961
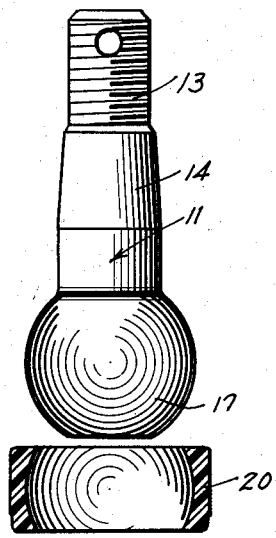
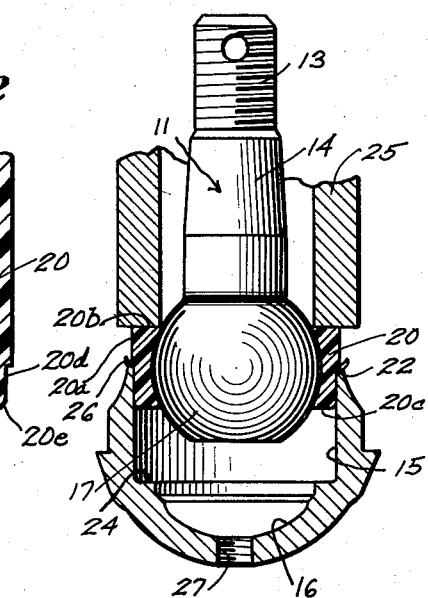
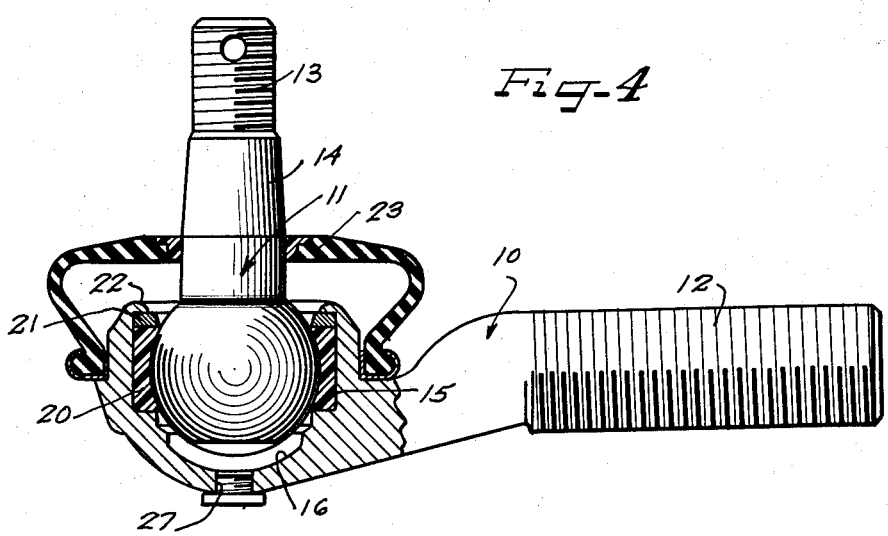
INVENTOR.
Paul D. Fadow
BY
ATTORNEYS

United States Patent Office 3,147,537
Patented Sept. 8, 1964

3,147,537
METHOD OF MANUFACTURING BALL JOINTS
Paul D. Fadow, Warren, Mich., assignor to Thompson Ramo Wooldridge Inc., Detroit, Mich., a corporation of Ohio
Filed Apr. 3, 1961, Ser. No. 100,323
4 Claims. (Cl. 29—149.5)

The present invention relates to ball and socket type joints commonly employed in automotive vehicle steering systems and the like, and is, more particularly, concerned with the manufacture of an essentially slack-free inexpensive manufactured ball joint having very close fit specifications while employing component parts that may be inexpensively manufactured to wide tolerances.

I am, of course, aware that a great variety of ball joint structures have been manufactured heretofore. Many of these joints have been highly successful as automotive vehicle suspension components. However, as those skilled in the automotive field are aware, ball and socket joints employed in the steering linkage itself have required manufacture to close tolerances in order to provide minimum slack in the joint, and hence in the steering system. In accordance with the present invention a ball joint having minimum final tolerance provisions is manufactured in an extremely simple manner from component parts having a rather wide tolerance latitude. As a result, the ball joint manufactured in accordance with the present invention can be manufactured very inexpensively and, at the same time, provides an extremely snug ball joint of amazingly consistent performance.

In accordance with the principles of the present invention, a bearing ring of generally annular configuration constructed of a thermoplastic resin is snapped under pressure over the ball of a ball joint stud and is positioned in a plane generally perpendicular to the axis of the stud. A generally cup-shaped socket is provided having an annular upstanding lip of an internal diameter slightly less than the external diameter of a plastic bearing ring after its assembly onto the ball stud. The bearing ring and ball are then positioned on the annular lip of the socket and forced, by means of a ram under high pressure, into the ball joint socket shaving the excess plastic material off the outer perimeter of the annular bearing ring. In this operation the upstanding lip of the ball joint socket acts as the shaving tool. After the annular bearing ring has seated in the bottom of the cup-shaped socket, the upstanding lip is rolled over either directly into contact with the annular bearing ring or against a seating washer to provide a permanently assembled joint.

It will be observed from the above procedure that as long as the annular bearing ring is of an external diameter greater than the internal diameter of the annular socket lip, the final outside diameter of the bearing ring will snugly fit the socket. This is true substantially independently of the actual internal diameter of the socket or the actual external diameter of the ring. Accordingly, the tolerance provisions of these two parts may be rather loosely maintained, as long as an interference fit is constantly provided.

After complete assembly of the joint, as above specified, it has been found that the actual pressure applied by the annular bearing ring in its tight seat against the ball joint stud is extremely high and, in fact, much too high for conventional automotive practice. Accordingly, the assembled ball joint is heated at a temperature substantially below the melting temperature of the plastic but at a sufficiently high temperature to stress-relieve the plastic material and to, in effect, remove a major portion of the stress loads imposed on the bearing ring by the press shaving operation. The stresses imparted to the bearing ring by the assembly operation impose loads providing, in examples tested, for example, a ball turning torque of approximately sixty inch pounds immediately after assembly. Upon heating the assembled joint for approximately an hour at a temperature permitting flow of plastic under high pressure, it has been found that the torque drops to a substantially lower figure, on the order of three or four inch pounds. Upon permitting the assembled joint to further cure at room temperature, the memory of the plastic material causes a slight return flow against the ball to provide a final stabilized torque figure of approximately ten inch pounds. Accordingly, it will be observed that in spite of utilizing components manufactured to extremely loose tolerances, and hence inexpensive in construction, an extremely uniform and stable end product is achieved which is capable of unusually satisfactory performance in the very demanding field of automotive suspension.

It is, accordingly, an object of the present invention to provide an improved and novel method of manufacturing a simple ball and socket joint.

Another object of the present invention is to produce a snug fitting ball joint having a controlled assembled torque characteristic.

Still another object of the invention is to provide a novel method of manufacturing a ball joint which permits utilization of component parts manufactured to rather loose tolerances without adversely affecting uniformity of the finished product.

A feature of the invention resides in the assembly of a ball and socket joint by shaving the ball bearing ring to its ultimate assembled size by means of the socket itself.

Another feature of the invention resides in the employment of a thermoplastic resin for the bearing ring of a ball and socket joint such that assembly loads applied thereto may be stressed-relieved to provide a consistent stabilized snug fitting ball joint.

Still other and further objects and features will at once become apparent to those skilled in the art from a consideration of the attached specification and drawings wherein one embodiment of the invention is shown by way of illustration only, and wherein:

FIGURE 1 is a side-elevational view of a ball stud positioned beside an annular thermoplastic bearing ring shown in cross-section;

FIGURE 2 is an enlarged fragmental view of the annular bearing ring shown in cross-section;

FIGURE 3 is a side-elevational view in partial cross-section illustrating the assembly of the ball stud with its bearing positioned thereon, into the ball socket; and FIGURE 4 is a side-elevational view in partial cross-section illustrating the completely assembled ball and socket joint of the present invention.

As shown on the drawings:

As may be seen from a consideration of the drawing, the joint of the present invention comprises a housing generally indicated at 10 in which is seated a ball stud generally indicated at 11. The housing 10 is provided with a conventional threaded end 12 for attachment to a rod or connecting link and, similarly, the stud 11 is provided with a threaded end 13 and tapered shank 14 for wedge attachment to a second link. The housing 10 is provided with a generally cylindrical cup-shaped bore 15 terminating in a lubricant reservoir 16. The round head 17 of the stud is seated in a segmental spherical thermoplastic annular bearing ring 20 which is seated in the bore 15 and permanently positioned therein by means of a washer 21 and spun-over lip 22. Lubricant within the joint proper is sealed in by means of a conventional rubber seal 23 and foreign contamination is also prevented from entering into the joint by the same seal.

It will be observed that the ball and socket joint of the present invention employs no separate spring or other biasing element. Instead, an extremely snug fit is provided during initial manufacture of the joint and it has been found that the close fit thus provided will provide a ball joint having exceptionally good wearing qualities over a long period of time. In manufacturing a ball and socket joint by the method of the present invention, the ball stud 11 is manufactured of hard material, such as for example, forged steel, and the round head portion 17 thereof is preferably smoothly finished to provide a hard and extremely fine surface capable of withstanding all normal wear when in contact with thermoplastic bearing materials such as nylon, Teflon, Alathon and acetal resins such as Delrin. The annular segmental spherical bearing ring 20 is constructed of a thermoplastic material, for example, one of the group of plastics above mentioned, and has an internal spherical diameter slightly smaller than the outside diameter of the ball. For example, in satisfactory joints constructed in accordance with the present invention, the internal diameter of the annular bearing was in the range of .001 to .008 inch smaller than the stud head diameter. Manifestly, in view of the segmental spherical shape of the annular bearing ring and its interference fit characteristic, above mentioned, the annular bearing ring must be snapped over the ball head under pressure. Since thermoplastics of the type above mentioned will yield slightly under pressure loads, this snapped assembly may readily be accomplished. For example, when employing an annular bearing ring construction of Delrin, an acetal resin manufactured by E. I. du Pont de Nemours & Company, employs the tolerances above mentioned, the annular bearing ring was readily snapped onto the ball with an axial force on the order of 350 pounds. Upon assembly in this manner, the stud and bearing ring takes the form generally illustrated in FIGURE 3.

As will be observed from a consideration of FIGURE 3, the outside diameter 20a of the ring 20 is slightly larger than the bore 15. In accordance with the present invention, the annular lip 22 of the socket is provided with a relatively sharp, squared-off corner which acts as a built-in shaving tool. In assembly, the power-driven ram 25 acts against the upper edge 20b of the bearing ring forcing it into the bore 15. This action shaves the outside diameter of the bearing ring, as indicated at 26 providing a substantially exact fit between the outside of the bearing ring and the inside diameter of the generally cylindrical bore 15. During the pressing of the bearing ring and assembled stud into the bore 15, the bottom surface 20c of the bearing ring seats against shoulder 24 thereby properly positioning the stud and bearing ring in the housing. Following the above positioning, the washer 21 is positioned on top of the ring and the upstanding lip 22 is spun over the washer to provide a tight assembly. Grease may be introduced into the reservoir 16 by way of an opening 27 which may subsequently be permanently closed, or, alternatively, provided with a grease fitting.

As may be observed from a consideration of FIGURE 2, the annular bearing ring 20 is preferably provided with a reduced starter diameter portion 20d, which is, like the external surface of the ring, generally cylindrical. This starter surface is of a diameter only very slightly smaller than the inside diameter of the bore 15. A slight chamfer 20e may also be provided, if desired to provide a small clearance volume at the bottom of the bore 15 when the ring 20 is seated, to thereby accommodate any small foreign bodies that may be present and, accordingly, permit proper seating of the ring. A small annular relief area may, alternatively, be provided in the surface 24 of the socket for the same clearance purpose. As has been noted above, various plastic materials may be employed as long as they are thermoplastic in nature and are of a hardness less than the hard material of the socket 10 and will distort under temperatures lower than those that will cause distortion or flow of the socket material. One very satisfactory material that has been employed in accordance with the invention as above specified, is acetal resin polymer marketed under the trademark "Delrin." This material is commonly designated a high melting, highly crystalline polyoxymethylene and has high strength and stiffness, good fatigue life and outstanding resilience and toughness. Employing this thermoplastic material in a bearing having a 1.123 inch segmental spherical internal diameter and a 1.266 inch outside diameter, a small shaving chamfer and a length of .565 inch, in combination with a 1.125 inch diameter ball and a socket bore of 1.253 of very satisfactory results were achieved. The parts as thus manufactured were assembled, with the bearings being snapped onto the ball with a force of approximately 350 pounds after which the ball and bearing subassembly were forced into the socket on the order of 1,300 pounds. Approximately .015 inch of plastic bearing material was shaved from the bearing outside diameter during the assembly process. During the assembly, a grease lubricant was applied to the segmental spherical bearing surface of the bearing ring and also to the outside diameter of the spherical ball. After rolling over the lip of the socket to provide an assembled structure, a turning torque on the order of sixty pound-inches was recorded. The entire assembly was then heated to a temperature of 203° F. for one hour and upon cooling the assembly to room temperature a turning torque of three to four pound-inches was recorded. Upon a two-day interval, however, a stabilized turning torque of approximately ten pound-inches was recorded, this figure remaining essentially unchanged with the further passage of time. It has been found that ball joints assembled with the parts employing normal tolerance limits in the above manner will produce assemblies with a stabilized turning torque on the order of ten to thirty pound-inches, the tolerance providing, preferably, a ball diameter which is .001 inch to .008 inch larger than the inside bearing diameter and a net outside shaving diameter preferably several thousandths of an inch or over.

It will be observed that a temperature of approximately 200° F. will provide a heat distortion of Delrin when assembled under pressure. The temperature may be increased, however, so long as the melting temperature of the material is not reached. The heat distortion temperature at relatively high pressures, on the order of 264 pounds per square inch as commonly tested, is somewhat less than 200° F. for nylon, Teflon, and Alathon, other thermoplastic bearing materials mentioned above. Accordingly, these may be heat-cured at a correspondingly lower temperature, for example, nylon may be heated to a temperature on the order of 150°.

It will be apparent, accordingly, that I have provided an improved method of manufacturing a ball and socket joint which provides an extremely snug fitting assembly with readily maintained manufacturing tolerances. Although rather loose tolerance requirements are provided, nevertheless, a consistent ball and socket joint product is achieved. This socket is particularly suited to automotive steering systems or the like since essentially all slack or looseness is eliminated from the joint connection and hence all steering mushiness is eliminated from the steering system. It will, of course, be further apparent to those skilled in the art that variations and modifications may be made in accordance with the principles of the present invention without departing from the novel concept thereof. It is, accordingly, my intention that the scope of the present application be limited solely by that of the hereinafter appended claims.

I claim as my invention:

1. The method of manufacturing a ball and socket joint having a ball stud swivelly mounted in a socket which comprises the steps of forming a generally cylindrical open-ended socket recess, snapping a thermoplastic segmental spherical bearing having its internal diameter smaller than the outside diameter of said ball and an outside diameter larger than the inside diameter of said socket onto said ball stud in an interference fit relationship therewith, and simultaneously sizing and assembling said assembled ball stud and segmental spherical bearing into said socket by forcing said bearing longitudinally into said socket and simultaneously shaving the outside diameter thereof by said inside diameter of said socket to provide a substantially non-clearance fit between said bearing and said socket.

2. The method of manufacturing a ball and socket joint having a ball stud swivelly mounted in a socket member which comprises the steps of forming a generally cylindrical open-ended socket, providing a thermoplastic bearing element having a segmental spherical inside diameter smaller than the outside diameter of the ball stud and having a generally cylindrical outside diameter larger than the inside diameter of said open-ended socket, snapping said annular bearing onto said stud by the application of force longitudinally of said stud against said bearing, and forcing the assembled stud and bearing into said socket by shaving the outside diameter of said bearing with the open end of said socket to provide an essentially non-clearance fit between said bearing and said socket, and spinning over the shaving end of said socket to retain said bearing in assembled position therewith.

3. The method of manufacturing a ball and socket joint having a generally cup-shaped cylindrical socket and a segmental spherical ball which comprises forming a generally vertical open-ended socket having an upstanding annular lip, providing a thermoplastic bearing having a segmental spherical inwardly facing bearing surface with an inside diameter smaller than the outside diameter of said ball and having an outside cylindrical surface of a diameter greater than the internal diameter of said socket, axially forcing said bearing member onto said ball, axially forcing said bearing member into said socket and simultaneously shaving the outside diameter surface thereof with said lip to provide an essentially non-clearance fit between said bearing and said socket, and heating said thermoplastic material in position in said joint to its heat distortion point under the load in said joint to thereby stress-relieve said plastic bearing.

4. The method of manufacturing a ball and socket joint having a generally cup-shaped cylindrical socket and a segmental spherical ball which comprises forming a generally vertical open-ended socket having an upstanding annular lip, providing a segmental spherical inwardly facing bearing surface of Delrin or like thermoplastic bearing material with an inside diameter smaller than the outside diameter of said ball and having an outside cylindrical surface of a diameter greater than the internal diameter of said socket, axially forcing said bearing member onto said ball, axially forcing said bearing member into said socket and simultaneously shaving the outside diameter surface thereof with said lip to provide an essentially non-clearance fit between said bearing and said socket, and heating said thermoplastic material in position in said joint on the order of 200° F.

References Cited in the file of this patent

UNITED STATES PATENTS

| | | |
|---|---|---|
| 2,553,743 | Booth | May 22, 1951 |
| 2,624,907 | Graham | Jan. 13, 1953 |
| 2,701,907 | Heim | Feb. 15, 1955 |
| 2,878,047 | Booth | Mar. 17, 1959 |
| 2,932,081 | Witte | Apr. 12, 1960 |
| 2,979,353 | Sellers | Apr. 11, 1961 |